(12) United States Patent
Bender et al.

(10) Patent No.: US 11,353,110 B2
(45) Date of Patent: Jun. 7, 2022

(54) AXIAL PISTON PUMP FOR A HYDROSTATIC PROPULSION DRIVE, HYDROSTATIC PROPULSION DRIVE WITH THE AXIAL PISTON PUMP, AND METHOD FOR CONTROL

(71) Applicant: Robert Bosch GmbH, Stuttgart (DE)

(72) Inventors: Frank Bender, Stuttgart (DE); Jochen Mayer, Giengen An der Brenz (DE); Steffen Mutschler, Neu-Ulm (DE); Ulrich Lenzgeiger, Dinkelscherben (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 16/847,409

(22) Filed: Apr. 13, 2020

(65) Prior Publication Data
US 2020/0332891 A1  Oct. 22, 2020

(30) Foreign Application Priority Data

Apr. 16, 2019 (DE) ...................... 10 2019 205 505.2

(51) Int. Cl.
*F16H 61/431* (2010.01)
*F04B 49/06* (2006.01)
*F16H 61/435* (2010.01)

(52) U.S. Cl.
CPC .......... *F16H 61/431* (2013.01); *F04B 49/06* (2013.01); *F04B 49/065* (2013.01); *F16H 61/435* (2013.01)

(58) Field of Classification Search
CPC ...... F16H 61/431; F16H 61/435; F16H 61/46; F16H 61/47; F04B 49/065
See application file for complete search history.

(56) References Cited

U.S. PATENT DOCUMENTS

| 4,474,104 | A  | * | 10/1984 | Creffield | F04B 1/07 91/497 |
|---|---|---|---|---|---|
| 8,438,846 | B2 | * | 5/2013 | Ohtsukasa | F16H 61/421 60/431 |
| 9,057,437 | B2 | * | 6/2015 | Kaneko | B66F 9/22 |
| 10,233,950 | B2 | * | 3/2019 | Bitter | F15B 11/028 |
| 10,550,934 | B2 | * | 2/2020 | Kuemmel | F16H 61/4157 |
| 2010/0024409 | A1 | | 2/2010 | Shiina et al. | |
| 2015/0336609 | A1 | | 11/2015 | Smith et al. | |
| 2016/0265520 | A1 | | 9/2016 | Skinner, Jr. et al. | |
| 2020/0003206 | A1 | * | 1/2020 | Mueller | F04B 1/26 |

FOREIGN PATENT DOCUMENTS

| DE | 102017207170 B3 | 10/2018 |
|---|---|---|
| EP | 2 123 948 A1 | 11/2009 |
| EP | 2 865 923 A1 | 4/2015 |

* cited by examiner

*Primary Examiner* — Michael Leslie
(74) *Attorney, Agent, or Firm* — Maginot, Moore & Beck LLP

(57) ABSTRACT

A hydrostatic axial piston pump has adjustable swept volume and is configured for fluidic connection to a hydraulic motor of a hydrostatic propulsion drive in a hydraulic circuit. The hydrostatic axial piston pump includes an adjusting unit configured to adjust the swept volume. The adjusting unit has an actuating cylinder with a first actuating pressure chamber, in which a first actuating pressure can be set via a first pressure reducing valve. The first actuating pressure is dependent on a first current at a first electromagnet of the first pressure reducing valve. An electronic control device is configured to store a model of the first current in a manner which is dependent on a requested speed.

12 Claims, 4 Drawing Sheets

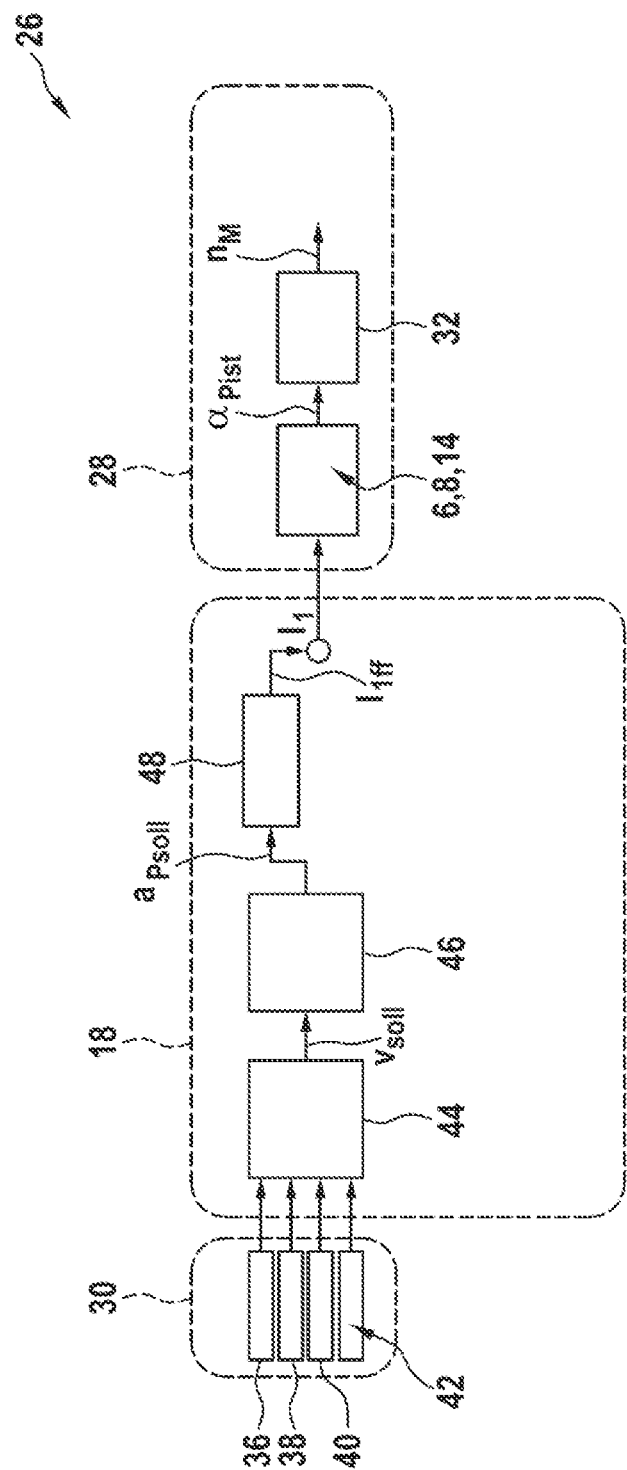

AXIAL PISTON PUMP FOR A HYDROSTATIC PROPULSION DRIVE, HYDROSTATIC PROPULSION DRIVE WITH THE AXIAL PISTON PUMP, AND METHOD FOR CONTROL

This application claims priority under 35 U.S.C. § 119 to patent application no. DE 10 2019 205 505.2, filed on Apr. 16, 2019 in Germany, the disclosure of which is incorporated herein by reference in its entirety.

The disclosure relates to a hydrostatic axial piston pump for a hydrostatic propulsion drive for a mobile machine, to a corresponding hydrostatic propulsion drive, and to a method for controlling the axial piston pump.

BACKGROUND

Hydrostatic propulsion drives are known, in particular for mobile machines, in the case of which a hydrostatic axial piston pump and one or more hydrostatic motors are connected to one another in a closed hydraulic circuit. The pump is driven by a drive machine, for example an internal combustion engine, in particular a diesel engine, an electric machine or a hybrid drive, and the motors in turn drive, for example, wheels or axles or tracks of the mobile machine.

The axial piston pump frequently has an adjustable swept volume. Thus, for example, at a constant rotational speed of the drive machine, the conveyed pressure medium volumetric flow in the closed circuit can be changed, with the result that an output rotational speed of the motors and therefore a driving speed of the mobile machine can be adjusted.

Output rotational speed regulation means and regulators with a feedback of the adjustment of the swept volume of the axial piston pump (what are known as EP pumps) are known from the prior art. In the case of axial piston pumps of swash plate design, an actual pivoting angle of the swash plate is fed back here.

Rotational speed-dependent (DA) adjusting units for axial piston pumps are also known from the prior art, in the case of which a regulating valve generates an actuating pressure which is dependent on the drive rotational speed of the axial piston pump and on the working pressure in the hydraulic circuit. The actuating pressure is fed by way of an electromagnetically actuable 4/3-way valve to the two counteracting actuating chambers of the actuating cylinder of the axial piston pump. As a result of the dependence of the actuating pressure on the working pressure, there is a load sensitivity which can be disadvantageous for a required speed-controlled operation of the propulsion drive.

An alternative control of the delivery volume of the axial piston pump is known as an electrically, directly controlled adjustment (ET). Here, in each case one independently and electrically actuable pressure reducing valve is provided for each of the two actuating pressure spaces of the actuating cylinder of the axial piston pump which act counter to one another. Here, each pressure reducing valve is assigned a throughflow direction of the axial piston pump. The respective actuating pressure which is set by the pressure reducing valves is proportional to the preselected current strength of the actuation. It is also the case here that the delivery volume is set in a manner which is dependent not only on the actuating current, but rather also on the rotational speed and the working pressure.

It is a disadvantage of the ET-regulated or DA-regulated pump that no exact speed control is possible in the case of a varying load.

In the case of the use of the EP-regulated pump, high costs are produced by way of mechanical feedback of the actual pivoting angle, and additional complexity in the case of the start up in order to compensate for restoring forces on the pivot cradle.

The ET-regulated pump can additionally be provided with a pilot control for the compensation of disturbance variables. Accuracy is also difficult to achieve here, however, since parameters and characteristic diagrams are not known with sufficient accuracy. High parameterization occurs in the case of start up.

If the ET-regulated pump is used with an additional regulation for the compensation of the disturbance variables, dynamics of the adjustment are low. In addition, a measuring device for the pivoting angle has to be provided.

For the ET-regulated pump, said pilot control and the regulation can also be combined. A failure of the measuring device then leads to a reduced accuracy of the speed control, however. The propulsion behavior of the propulsion drive might change when components are subject to wear. In addition, a parameterization complexity in the case of start up is high.

SUMMARY

In contrast to the above, the disclosure is based on the object of providing a hydrostatic axial piston pump for a speed-controlled hydrostatic propulsion drive for a mobile machine, which hydrostatic axial piston pump makes robust speed control in the case of a varying load possible, with simultaneously low complexity in terms of apparatus technology. Furthermore, the object consists in providing a corresponding hydrostatic propulsion drive, and a method for controlling the axial piston pump, in particular the hydrostatic propulsion drive.

The first object is achieved by way of a hydrostatic axial piston pump, the second object is achieved by way of a hydrostatic propulsion drive, and the third object is achieved by way of a method.

An axial piston pump for a speed-controlled, hydrostatic propulsion drive has an adjustable swept volume, and is provided for the fluidic connection to a hydraulic motor in an, in particular closed, hydraulic circuit. For the adjustment of the swept volume of the axial piston pump, an adjusting unit is provided which has an actuating cylinder with a first actuating pressure chamber, in which a first actuating pressure can be set via a first pressure reducing valve. Said first actuating pressure is dependent on a first current at a first electromagnet of the first pressure reducing valve. In addition, an electronic control device is provided, in which a model of the first current is stored in a manner which is dependent directly or indirectly on a requested speed of the propulsion drive. According to the disclosure, the axial piston pump has a learning and/or adaptation device which is configured in such a way that the model, in particular at least one parameter or characteristic diagram of the model, can be adapted via it in a manner which is dependent on the first current and an actual speed of the propulsion drive, which actual speed can be assigned or is assigned to it.

By way of a learning and adaptation effect, the model can be refined to an ever greater extent within the course of a learning or adaptation phase, with the result that it becomes increasingly more precise. This can go so far that a regulation can be dispensed with largely or even completely. This is accompanied by the fact that high precision and high driving dynamics can be achieved and, at the same time, a risk of a control loop oscillating is reduced or is zero, which leads to a higher system robustness. In the case of a complete omission of a regulation, detection devices or estimation devices which are conventionally necessary for this purpose can even be dispensed with, which reduces the complexity. In addition, the learning and/or adaptation device makes reduced complexity possible in the case of start up as a result of learning of the correct characteristic diagram or model parameters.

In particular, for the realization of speed-controlled driving even in the opposite direction and/or towing operation at least in one of the two driving directions, in one development the actuating cylinder has a second actuating pressure chamber which acts counter to the first actuating pressure chamber and in which a second actuating pressure can be set in the mentioned way via a second pressure reducing valve, which second actuating pressure is dependent on a second current at a second electromagnet of the second pressure reducing valve. Here, the model which is stored in the electronic control device additionally comprises a model of the second current in a manner which is directly or indirectly dependent on the requested speed. In addition, the adaptation device is preferably configured in such a way that the model of the second current, in particular at least one parameter or characteristic diagram of said model, can be adapted via it in a manner which is dependent on the second current and the actual speed which can be assigned or is assigned to the latter. The abovementioned advantage therefore also results for the other drive direction and all possible traction and towing operation directions or types.

For reasons of clarity, the following developments are preferably worded with regard to the first actuating pressure chamber, the first pressure reducing valve, the first actuating pressure, the first current, the first electromagnet and the model of the first current. It goes without saying, however, that they also apply as an alternative or in addition to the second actuating pressure chamber, the second pressure reducing valve, the second actuating pressure, the second current, the second electromagnet and the model of the second current.

In one development, the axial piston pump has a regulating device, via which a deviation of the actual speed from the requested speed can be corrected. As an alternative or in addition, a deviation of a detected or estimated actual value, on which the actual speed is dependent, from a requested value which can be assigned or is assigned to the actual value can be corrected by the regulating device. Said estimated actual value is, in particular, an actual pivoting angle of the axial piston pump if it is configured in a bent axis or swash plate design. The requested value is then, in particular, a requested pivoting angle.

In other words, the regulating device can be configured in such a way that its regulating intervention is active on a speed level and/or on a pivoting angle or displacement volume level.

In particular, if characteristic values of the hydraulic motor are stored in the control device, the requested pivoting angle can be determined in one variant from the requested speed and a volumetric flow balance of the axial piston pump and the hydraulic motor, and in an additional or alternative variant from a characteristic diagram. The last-mentioned variant makes it possible to take leakage and therefore the degree of efficiency of the axial piston pump and the hydraulic motor into consideration.

Said balance is as follows for the requested speed $v_{Soll}$ and the requested pivoting angle $\alpha_{P,Soll}$ of the axial piston pump which results therefrom:

$$\frac{v_{Soll}}{U_{Rad}} = n_{M,Soll}; n_{M,Soll} \cdot V_M = Q_{M,Soll};$$

$$Q_{M,Soll} = Q_{P,Soll}; = \frac{Q_{P,Soll}}{n_P} = V_{P,Soll}; \frac{V_{P,Soll}}{V_{P,max}} \cong \alpha_{P,Soll} \Rightarrow \alpha_{P,Soll}$$

In an analogous manner, the following balance applies to the actual speed $v_{ist}$ and the resulting, estimated actual pivoting angle $\alpha_{P,Est}$:

$$\frac{v_{Ist}}{U_{Rad}} = n_{M,Ist} \Rightarrow n_{M,Ist} \cdot V_M =$$

$$Q_{M,Ist} \Rightarrow Q_{M,Ist} = Q_{P,Ist} \Rightarrow \frac{Q_{P,Ist}}{n_P} = V_{P,Ist} \Rightarrow \frac{V_{P,Ist}}{V_{P,max}} \cong \alpha_{P,Ist} \Rightarrow \alpha_{P,Ist}$$

In one development, an input variable of the regulating device is the requested pivoting angle, and the actual pivoting angle of the axial piston pump which is estimated from the balance or the characteristic diagram.

For the estimation of the actual pivoting angle of the axial piston pump, an "observer" or an estimation device is provided in one development, in which said balance or the characteristic diagram is stored for the evaluation. As an alternative or in addition, a detection device can be provided for the detection of the actual pivoting angle of the axial piston pump, which leads to a more precise result than the estimation.

In one development, first output values of the regulating device and the control device with regard to the first current can be linked or are linked to the first current via a first operator. Thus, the first output values are added or summed via the first operator to form the first current. As an alternative or in addition, second output values can be linked or are linked to the second current via a second operator, with the result that the second output values are added or summed to form the second current.

In one development, the adaptation device is configured in such a way that a model of the regulating device, in particular at least one parameter or characteristic diagram of said model, can also be adapted via it in a manner which is dependent on the first current and the actual speed which can be assigned or is assigned to the latter. As an alternative or in addition, the adaptation device is configured in such a way that a model of the regulating device, in particular at least one parameter or characteristic diagram of said model, can be adapted via it in a manner which is dependent on the second current and the actual speed which can be assigned or is assigned to the latter.

In one development, the adaptation device is configured in such a way that the model of the control device and a model of the regulating device can be adapted via it in such a way that the first output value of the regulating device can be minimized, and is close to zero or is zero. As an alternative or in addition, the adaptation device is configured in such a way that the model of the control device and a model of the regulating device can be adapted via it in such a way that a second output value of the regulating device can be minimized, and is close to zero or is zero.

In one development, the regulating device is configured such that it can be deactivated in an automated manner or by way of an operating person, in particular following an adaptation operation or a start up. The regulating device preferably has a standby mode. In particular, it has continuous monitoring of the deviation, with the result that (renewed) intervention of the regulating device above a predefined threshold of the deviation is possible at any time.

In one development, the adaptation device is configured such that it can be deactivated in an automated manner or by way of an operating person, in particular following an adaptation operation or a start up. The adaption device preferably has a standby mode. In particular, it has continuous monitoring of the deviation, with the result that (re) starting of the adaptation of the model or of the models is possible at any time, for example in the case of service life-induced ageing of the axial piston pump, the hydraulic motor and/or the hydraulic circuit.

In one development, the adaptation device has a cancelation condition for the adaptation at least in a manner which is dependent on the first current and the actual speed which can be assigned or is assigned to it. As an alternative or in addition, the adaptation device has a cancelation condition for the adaptation at least in a manner which is dependent on the second current and the actual speed which can be assigned or is assigned to it.

In one development, the respective model in each case has a static part and a dynamic part, it being possible for the adaptation device to have an adapting action on one of the parts or on the two parts.

The axial piston pump preferably has at least one operating element for the detection of the requested speed, in particular an accelerator pedal or a driving joystick, or at least one interface for said operating element. In addition, further operating elements can be provided, such as driving direction switches, driving range selection switches, an inching pedal or cruise control, or corresponding interfaces.

The adaptation device, the control device and optionally the regulating device and/or the observer are preferably combined to form one control unit, in particular in a structural and/or logical manner.

The abovementioned interface or interfaces is/are preferably provided on the control unit.

The control unit preferably has an interpretation or determination device which is connected or signal-connected, in particular, to the interface or interfaces, via which interpretation or determination device a position of the accelerator pedal and/or of other operating elements can be interpreted, from which the requested speed can be derived.

In one development, the hydraulic motor has a constant displacement volume, as a result of which the abovementioned balances and estimations can be carried out comparatively simply. As an alternative, it has an adjustable displacement volume. In order to carry out the balances, an additional detection device for its displacement volume and/or an estimation device for the estimation thereof are/is preferably provided.

A speed-controlled hydrostatic propulsion drive, in particular for a mobile machine, has an axial piston pump which is configured in accordance with at least one aspect of the preceding description. It is connected fluidically to a hydraulic motor in an, in particular closed, hydraulic circuit, and is coupled or can be coupled to a drive machine, in particular an internal combustion engine. The hydraulic motor is coupled or can be coupled to an output, in particular a wheel, an axle or a track.

A method for controlling the axial piston pump which is configured in accordance with at least one aspect of the preceding description has at least the steps "model-based determination of a first current which is assigned to a requested speed", and "actuation of the first electromagnet by way of it". According to the disclosure, the method has a step of "adaptation of the model at least in a manner which is dependent on an actual speed and the first current".

In addition, it preferably has an upstream step of "detection of the requested speed", and a step of "detection of the actual speed".

In one development of the method, a step takes place of "model-based correction of a difference of the requested speed and the actual speed, or a difference which is dependent on said speeds".

In one development of the method, a step takes place of "adaptation of the model or the models in a manner which is dependent on at least the actual speed and the first current in such a way until the correction, in particular in accordance with a predefined cancelation condition, can be dispensed with".

In one development of the method, a step takes place of "deactivation of the adaptation device in a manner which is dependent on a predefined cancelation condition, and/or deactivation of the regulating device in a manner which is dependent on a predefined cancelation condition".

One exemplary embodiment of a hydrostatic axial piston pump according to the disclosure, a propulsion drive which is configured with the former, and a method for controlling the axial piston pump are shown in the drawings.

BRIEF DESCRIPTION OF THE DRAWINGS

The disclosure will now be described in greater detail on the basis of the figures of said drawings, in which:

FIG. 4 shows a logic circuit diagram of the propulsion drive according to the disclosure in accordance with FIGS. 2 and 3 and the method according to the disclosure which is stored therein, in purely controlled operation.

DETAILED DESCRIPTION

Figure 1:
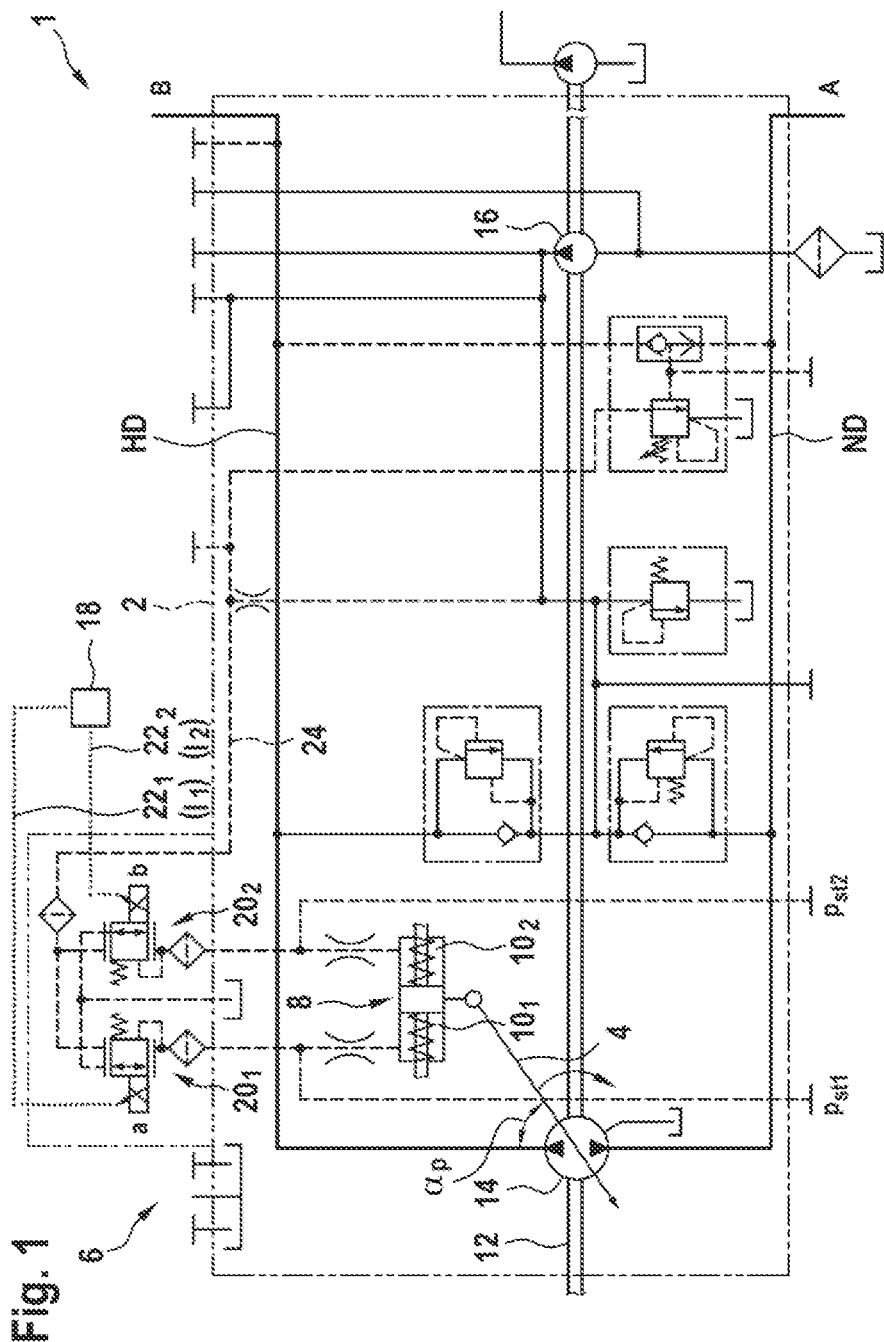
FIG. 1 shows a hydraulic circuit diagram of an axial piston pump according to the disclosure in accordance with a first exemplary embodiment.

FIG. 1 shows a circuit diagram of the exemplary embodiment of an axial piston pump 1 according to the disclosure. Only those components of the axial piston pump which are essential to the disclosure will be described. Said axial piston pump 1 has a housing 2, on which two working connectors A, B are formed, to which in each case one working line (not shown) of a closed circuit is closed. By way of a hydraulic motor (not shown) which is incorporated fluidically into the circuit, a hydrostatic propulsion drive according to the disclosure for a mobile machine (not shown) is thus formed.

The axial piston pump 1 is configured with a swash plate 4, the pivoting angle $\alpha_P$ of which can be set via an adjusting unit 6. A double-acting actuating cylinder 8 serves for this purpose which has a first actuating pressure chamber $10_1$ and a second actuating pressure chamber $10_2$ which acts counter to the former.

A first pilot pressure $p_{st1}$ acts in the first actuating pressure chamber $10_1$ in the direction of an enlargement of the pivoting angle $\alpha_P$ and therefore in the direction of an enlargement of the swept volume $V_P$ of the axial piston pump 1. This is counteracted by a second actuating pressure $p_{st2}$ in the second actuating pressure chamber $10_2$ in the direction of a reduction of the pivoting angle $\alpha_P$ and therefore in the direction of a reduction of the swept volume $V_P$ of the axial piston pump 1. An actuating pressure difference $\Delta p_{st} = p_{st1} - p_{st2}$ can be defined here, said actuating pressure difference $\Delta p_{st}$ always acting in the direction of an enlargement of the pivoting angle $\alpha_P$ or the swept volume $V_P$ in accordance with the definition in the exemplary embodiment.

The driving mechanism 14 of the axial piston pump 1 and, moreover, also a feed pump 16 are driven via a drive shaft 12 of said axial piston pump 1. The drive shaft 12 is driven by a diesel engine (not shown), and rotates at a rotational speed $n_P$. Said rotational speed $n_P$ acts together with the actuating pressure difference $\Delta p_{st}$ in the direction of an enlargement of the pivoting angle $\alpha_P$. More specifically, an increase in the rotational speed $n_P$ acts in this way.

A characteristic of the axial piston pump 1 is stored in an electronic control unit 18 as formulae and/or as characteristic diagrams or characteristic curves.

Furthermore, the rotational speed $n_P$, the actuating pressure difference $\Delta p_{st}$ and the high pressure HD are measured. In this way, operating points of the axial piston machine 1 according to the disclosure can be actuated, without a feedback in the sense of a regulating circuit being necessary for this purpose.

The two actuating pressures $p_{st1}$, $p_{st2}$ are actuated via two pressure reducing valves $20_1$, $20_2$. The latter have in each case one electric magnet a, b, which electric magnets are connected via a respective electric line $22_1$, $22_2$ to the electronic control unit 18.

The two pressure reducing valves $20_1$, $20_2$ are designed in such a way that the respective actuating pressure $p_{st1}$, $p_{st2}$ is proportional to the respective current strength $I_1$, $I_2$.

The two pressure reducing valves $20_1$, $20_2$ are supplied on the inlet side by the feed pump 16 via a feed pressure line 24.

Figure 2:
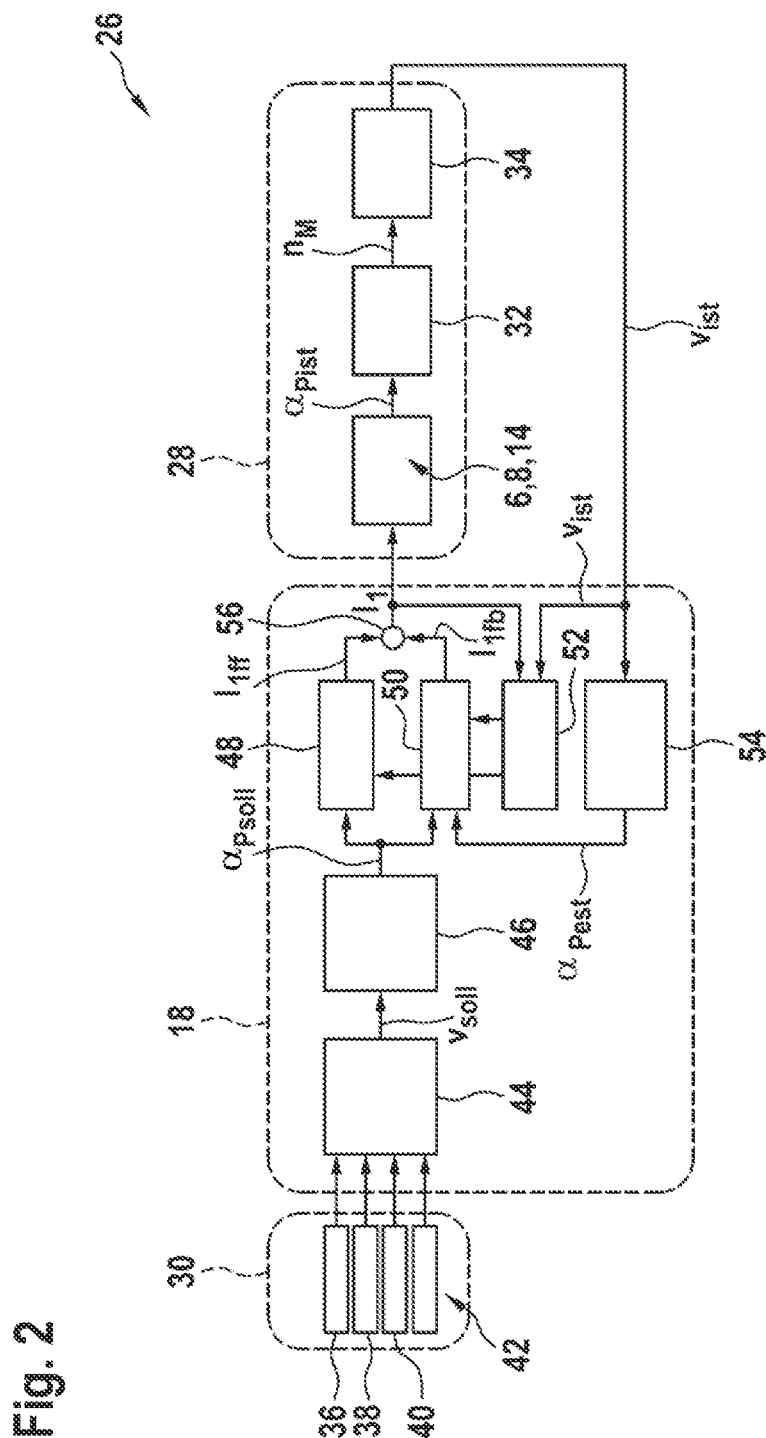
FIG. 2 shows a logic circuit diagram of a propulsion drive according to the disclosure with the axial piston pump according to FIG. 1 and a method according to the disclosure which is stored therein, in adaptation operation which is based on the pivoting angle.

FIG. 2 shows a logic circuit diagram of a hydrostatic propulsion drive 26 with the axial piston pump 1 according to FIG. 1, the latter being shown in a manner which is reduced to the abovementioned components of adjusting unit 6, actuating cylinder 8, driving mechanism 14 and control unit 18. The propulsion drive 26 has a propulsion drive train 28 and an operator interface 30. The propulsion drive train 28 comprises the axial piston pump 6, 8, 14 with an adjustable swept volume $V_P = f(\alpha_P)$, and a hydraulic motor 32 which is configured with a constant displacement volume $V_M$. They are both arranged in a closed, hydraulic circuit, as described above. Furthermore, the propulsion drive train 28 has a detection device 34 for the detection of the actual value of a driving speed $v_{ist}$.

For the definition of a speed request, the operator interface 30 (HMI) has an accelerator pedal 36, an inching pedal 38, cruise control 40, and further operating elements 42.

The control unit 18 has an interpretation device 44 for the conversion of the speed request of the operator into a speed specification or required speed $v_{soll}$. In addition, the control unit 18 has a calculation device 46 for the calculation of a requested pivoting angle $\alpha_{P,Soll}$ of the axial piston pump 1 according to FIG. 1 from the requested speed $v_{soll}$.

Furthermore, the control unit 18 has a control device 48, a regulating device 50 which can be superordinate or is superordinate with respect to the former, an adaptation device 52, and an estimation device 54.

According to FIG. 2, a deflection of the accelerator pedal 36 which is signal-connected to the interpretation device 44 takes place. Said interpretation device 44 converts the driver's request into a requested speed $v_{soll}$ which is entered into the calculation device 46. In the latter, with the assumption of a constant motor 32 with a constant displacement volume $V_M$, the calculation of a corresponding setpoint pivoting angle $\alpha_{Psoll}$ takes place. Said setpoint pivoting angle is entered into the control device 48 and into the regulating device 50. Characteristic diagrams and in each case one model of the first current $I_1$ in a manner which is dependent on the requested pivoting angle $\alpha_{Psoll}$, that is to say in a manner which is indirectly dependent on the requested speed $v_{soll}$, are stored in the two devices 48, 50. From the respective model and characteristic diagram, the devices 48, 50 determine first output values $I_{1ff}$ with regard to control ("feed-forward") and $I_{1fb}$ with regard to regulation ("feedback"). The two output values $I_{1ff}$ and $I_{1fb}$ are then added at a first operator 56 to form the first current $I_1$. This actuates the first electromagnet a via electric line $22_1$ according to FIG. 1, and brings about a first actuating pressure $p_{st1}$ in the first actuating pressure space ($10_1$) there via the first pressure reducing valve $20_1$ which is actuated by way of said first current $I_1$. An actual pivoting angle $\alpha_{Pist}$ results therefrom at the axial piston pump 6, 8, 14 according to FIG. 2, which actual pivoting angle $\alpha_{Pist}$ leads to a pressure medium volumetric flow $Q_P$ at the rotational speed $n_P$ of the axial piston pump and drive machine. Via the abovementioned balance, the output rotational speed $n_M$ which is proportional to the actual speed $v_{ist}$ results therefrom at the hydraulic motor 32. The actual speed $v_{ist}$ is detected by the detection device 34 and is reported to the estimation device 54. The latter estimates the actual pivoting angle, since this is not detected. The estimated actual pivoting angle is called $\alpha_{Pest}$. It is entered into the regulating device 50 as a second input variable, in addition to the setpoint value $\alpha_{Psoll}$ of the pivoting angle. In this way, the expensive detection of the actual pivoting angle $\alpha_{Pist}$ can be dispensed with, and regulation can nevertheless take place. In addition, the actual speed $v_{ist}$ is entered into the adaptation device 52 together with the first current $I_1$, on which it is based. In the course of this, the learning and adaptation algorithm which is stored there changes the model parameters of the models which are stored in the devices 48 and 50 and/or the characteristic diagrams of the first current $I_1$, with the result that the first output value $I_{1fb}$ of the regulating device 50 becomes smaller and smaller as the adaptation increases, that is to say the regulation decreases.

The adaptation device 52 is preferably configured in such a way that, during the course of the adaptation operation, a constantly improved match between the parameters of the models which are used and the parameters of the models which are actually present results.

In this way, ageing effects of the components can also be taken into consideration in the control of the axial piston pump 1. This results in a consistently satisfactory driving behavior.

As a result of the depicted adaptation of the characteristic diagrams and/or parameters, the control by means of the control device 48, in particular, is improved more and more, with the result that the regulation by way of the regulation device 50 can be dispensed with completely from a certain time or cancelation criterion. This case is shown in FIG. 4.

The regulating device 50, the adaptation device 52 and the estimation device 54 are then deactivated (not shown graphically).

Since only control and no longer regulation then takes place, the axial piston pump and the propulsion drive have a robustness, for example, against sensor failure. In this case, a measurement of the actual speed $v_{ist}$ can then be dispensed with. The omission of sensor systems is to be valued highly, since a sensor failure which is possible at any time usually has very unfavorable effects on the speed control.

In order to learn the required parameters and characteristic diagrams, however, a temporary use of a sensor for the actual speed $v_{ist}$ and a pivoting angle sensor for the actual pivoting angle $\alpha_{ist}$ can prove appropriate in the learning and adaptation phase, in order to shorten the learning and adaptation phase.

The adaptation of the parameters and/or the characteristic diagrams can take place by way of a step of "local adaptation of points in the characteristic diagram" and/or a step of "shifting of characteristic curves". It is an advantage of the characteristic curve shifting that points which are not accessed during operation are also adapted. For this purpose, a model approach is necessary which describes, for example, a linear link of the variable to be estimated with the pivoting angle. It can be a disadvantage of the characteristic curve shifting that a deterioration of some points occurs if the assumed link (for example, linear link) is incorrect.

Figure 3:
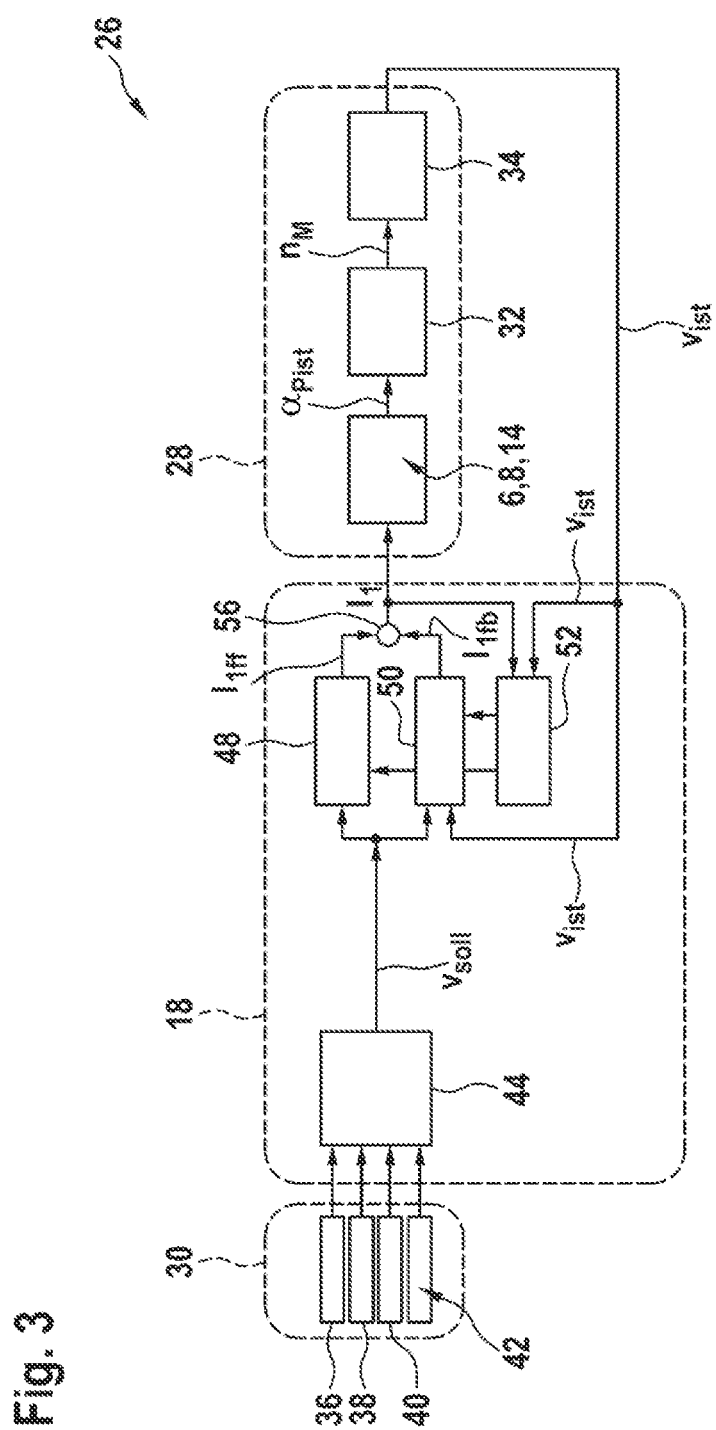
FIG. 3 shows a logic circuit diagram of the propulsion drive according to the disclosure in accordance with FIG. 2 and the method according to the disclosure which is stored therein, in adaptation operation which is based on the speed.

FIG. 3 shows one variant of the propulsion drive 26 according to FIG. 2, in the case of which the determinations of the pivoting angle $\alpha_{Psoll}$ from the requested speed $v_{soll}$ and of the estimated actual pivoting angle $\alpha_{pest}$ from the actual speed $v_{ist}$ are dispensed with, since the control device 48 and the regulating device 50 are active in a directly speed-dependent manner, that is to say without a reconstruction of the pivoting angle $\alpha$ from the speed v. In this case, the actual speed $v_{ist}$ is entered directly into the regulating device 50, and the setpoint speed $v_{soll}$ is entered directly into the control device 48 and the regulating device 50.

Advantages of the disclosure are a simplification and cost reduction as a result of the omission of an EP-regulated pump, improved performance as a result of precise speed tracking, reduced start up complexity, since required parameters are set and learned autonomously, an increase in safety, since a detection using measuring technology is required only temporarily and purely controlled operation becomes possible after start up, and the achieving of a consistent machine behavior over the service life in the case of continuous use of the adaptation device 52, since wear phenomena are compensated for by way of the adaptation of the parameters and/or the characteristic diagrams in the vehicle controller.

An axial piston pump for a hydrostatic propulsion drive is disclosed, with a hydraulically adjustable swept volume and an adjusting unit for this purpose, an adjusting pressure of the adjusting unit acting in a proportional manner with respect to an adjusting current, on which adjusting pressure the swept volume and indirectly a volumetric flow and a driving speed are dependent. Here, a control device is provided, in which a model and/or characteristic diagram of the adjusting current is stored in a manner which is dependent on a requested speed. According to the disclosure, a learning and/or adaptation device is provided, via which the model and/or characteristic diagram can be adapted in a manner which is dependent on the adjusting current and an actual speed which can be assigned or is assigned to it.

In addition, a hydrostatic propulsion drive with the axial piston pump is disclosed. Furthermore, a mobile machine, in particular a municipal vehicle, a wheel loader, an agricultural machine, such as a sprayer or a combine harvester, or the like, is disclosed, with a hydrostatic propulsion drive of this type. In addition, a method for controlling the axial piston pump and/or the propulsion drive is disclosed.

What is claimed is:

1. A hydrostatic axial piston pump for a speed-controlled hydrostatic propulsion drive, the hydrostatic axial piston pump having an adjustable swept volume, the hydrostatic axial piston pump comprising:
   an adjusting unit configured to adjust the swept volume, the adjusting unit including an actuating cylinder with a first actuating pressure chamber, in which a first actuating pressure is set via a first pressure reducing valve, the first actuating pressure being dependent on a first current at a first electromagnet of the first pressure reducing valve;
   an electronic control device configured to store a model of the first current in a manner which is dependent on a speed that one of (i) can be requested and (ii) is requested; and
   an adaptation device configured to adapt the model in a manner which is dependent on the first current and an actual speed which one of (i) can be assigned and (ii) is assigned to the first current,
   wherein the hydrostatic axial piston pump is included in a hydraulic circuit for fluidic connection to a hydraulic motor.

2. The hydrostatic axial piston pump according to claim 1, further comprising:
   a regulating device configured to correct a deviation of the actual speed from the requested speed.

3. The hydrostatic axial piston pump according to claim 2, wherein first output values of the regulating device and the electronic control device are linked to the first current via a first operator.

4. The hydrostatic axial piston pump according to claim 3, wherein the adaptation device is configured adapt a model of the regulating device in a manner which is dependent on the first current and the actual speed which one of (i) can be assigned and (ii) is assigned to the first current.

5. The hydrostatic axial piston pump according to claim 4, wherein the adaptation device is configured to adapt a model of the electronic control device and the model of the regulating device in such a way that a first output value of the regulating device one of (i) is minimized and (ii) is zero.

6. The hydrostatic axial piston pump according to claim 2, wherein the regulating device is configured to deactivate following one of (i) an adaptation operation and (ii) a start up.

7. The hydrostatic axial piston pump according to claim 1, wherein the adaptation device is configured to deactivate following one of (i) an adaptation operation and (ii) a start up.

8. The hydrostatic axial piston pump according to claim 1, wherein the adaptation device includes a cancelation condition of the adaptation at least in a manner which is dependent on the first current and the actual speed which one of (i) can be assigned and (ii) is assigned to the first current.

9. The hydrostatic axial piston pump according to claim 5, wherein the respective model in each case has a static part and a dynamic part.

10. The hydrostatic axial piston pump according to claim 1, wherein the hydraulic circuit is a closed hydraulic circuit.

11. A hydrostatic propulsion drive, comprising:
a hydraulic motor; and
an hydrostatic axial piston pump having an adjustable swept volume, the hydrostatic axial piston pump including (i) an adjusting unit configured to adjust the swept volume, the adjusting unit including an actuating cylinder with a first actuating pressure chamber, in which a first actuating pressure is set via a first pressure reducing valve, the first actuating pressure being dependent on a first current at a first electromagnet of the first pressure reducing valve, (ii) an electronic control device configured to store a model of the first current in a manner which is dependent on a speed that one of can be requested and is requested, and (iii) an adaptation device configured to adapt the model in a manner which is dependent on the first current and an actual speed which one of can be assigned and is assigned to the first current,
wherein the hydrostatic axial piston pump is connected fluidically to the hydraulic motor in a closed hydraulic circuit,
wherein the hydrostatic axial piston pump is coupled to a drive machine, and
wherein the hydraulic motor is coupled to an output.

12. A method for controlling at least one of (i) a hydrostatic axial piston pump and (ii) a propulsion drive, the method comprising:
performing a model-based determination of at least a first current assigned to a requested speed using a model;
actuating a first electromagnet by way of the determined first current; and
adapting the model in a manner dependent on an actual speed and at least the determined first current.

* * * * *